United States Patent [19]
Windes et al.

[11] Patent Number: 5,642,027
[45] Date of Patent: Jun. 24, 1997

[54] CURRENT-LIMITED SYSTEM FOR CAPACITIVE LOAD POWERING

[76] Inventors: John A. Windes, 24656 Eloisa; Samuel W. Stevens, 24656 Via Viento, both of Mission Viejo, Calif. 92691

[21] Appl. No.: 383,988

[22] Filed: Feb. 6, 1995

Related U.S. Application Data

[63] Continuation-in-part of Ser. No. 817,725, Jan. 7, 1992, Pat. No. 5,214,313, and Ser. No. 27,378, Mar. 8, 1993, abandoned.

[51] Int. Cl.⁶ .................. H02M 3/06; H02J 7/00; G05F 1/40
[52] U.S. Cl. .................. 320/1; 320/35; 323/283
[58] Field of Search .................. 320/1, 35; 323/282, 323/283, 901; 307/48

[56] References Cited

U.S. PATENT DOCUMENTS

| | | | |
|---|---|---|---|
| 3,733,540 | 5/1973 | Hawkins | 323/901 X |
| 5,105,144 | 4/1992 | Trump | 323/283 |
| 5,126,652 | 6/1992 | Carlin | 323/282 X |
| 5,214,313 | 5/1993 | Windes | 307/109 |

*Primary Examiner*—Peter S. Wong
*Assistant Examiner*—Patrick B. Law
*Attorney, Agent, or Firm*—Harry G. Weissenberger, Inc.

[57] ABSTRACT

In a capacitor-based energy storage system, in which the capacitor charging voltage is on the same order of magnitude as the system output voltage, the time between recharges for a given energy release rate is extended by producing an intermediate regulated capacitor output of a voltage having a lower order of magnitude and then stepping that voltage back up to the system output voltage through the use of an inverter. Regulation of the capacitor output voltage may be achieved through the use of a capacitor-voltage-dependent variable-duty-cycle switching transistor and an averaging network, which together maintain a level inverter input voltage independently of the capacitor voltage. The cycle control is powered by a rechargeable battery which recharges from the inverter input but cannot drive the inverter, and current and temperature sensing means are provided to control the transistor so as to limit the current draw through the transistor and to prevent battery overheating during operation.

3 Claims, 5 Drawing Sheets

5,642,027

1

CURRENT-LIMITED SYSTEM FOR CAPACITIVE LOAD POWERING

RELATED CASES

This application is a continuation-in-part of application Ser. No. 07/817,725 filed 07 Jan. 1992, now U.S. Pat. No. 5,214,313, and of application Ser. No. 08/027,378 filed 08 Mar. 1993, now abandoned.

FIELD OF THE INVENTION

This invention relates to capacitor-based electric power storage systems which utilize a large portion of the stored energy in order to lengthen the time between recharges of the capacitors.

BACKGROUND OF THE INVENTION

Electric power storage systems which use capacitors instead of batteries as the storage elements are not new. They have, however, found little practical application in high-power environments for a number of reasons. For one, the amount of energy storable in a battery was substantially larger than that storable in a capacitor; and for another, much of the energy stored in a capacitor was unusable because in a commercial power environment, the output voltage of a capacitor dropped to inadequate levels when only a relatively small portion of its stored energy had been expended.

The first problem has recently been resolved by the introduction of new types of capacitors termed supercapacitors or ultracapacitors which have a vastly increased energy storage capability without a corresponding increase in size. Nevertheless, storage systems based on these capacitors would still require relatively frequent recharging when charged from, e.g., a 440-volt supply and used to power a 220-volt device. Raising the charging voltage would be impractical because this would require additional insulation in the capacitors and make them bulky; and the output voltage cannot be changed because it is dictated by the nature of the load.

SUMMARY OF THE INVENTION

The invention allows less frequent and faster recharging of a commercial-voltage energy storage and release system by using energy storage supercapacitors, through the use of voltage regulators having a low-voltage output, to provide a regulated input to an inverter at a voltage which is a small fraction of the capacitor charging voltage, and then using the inverter to step the voltage up to a commercial level. This allows the supercapacitors to discharge down to a much lower voltage than would be possible if they were used to drive the load directly through a voltage regulator with a commercial-level output. As a result, a substantially larger part of the energy stored in the supercapacitors is usable before they must be recharged. In a typical installation, the supercapacitor charging voltage might be 440 V DC; the inverter input might be 12 V DC; and the inverter output might be 220 V AC or DC.

In another aspect of the invention, a specific preferred embodiment of a current-limited voltage regulator for the inventive system is disclosed. This voltage regulator supplies the inverter with an averaged square-wave voltage whose duty cycle at any given time is a function of the capacitor voltages at that time. The duty cycle function is such that the input voltage to this inverter remains constant at 12 V as long as the supercapacitor voltage is above that level.

2

The duty cycle of the square wave is controlled by a pulse width modulator which responds to the input voltage of the inverter. If there is no load on the inverter, i.e. if it draws no substantial current, inverter input voltage is high enough to shut off the pulse width modulator. If a load is then connected to the inverter, the inverter draws substantial current, and the voltage across its input drops enough to trigger the pulse width modulator. This connects the energy storage capacitors to the inverter, and they then supply the demand on the inverter until the load is removed or the energy storage capacitors are drained.

DESCRIPTION OF THE PREFERRED EMBODIMENTS

Figure 1:
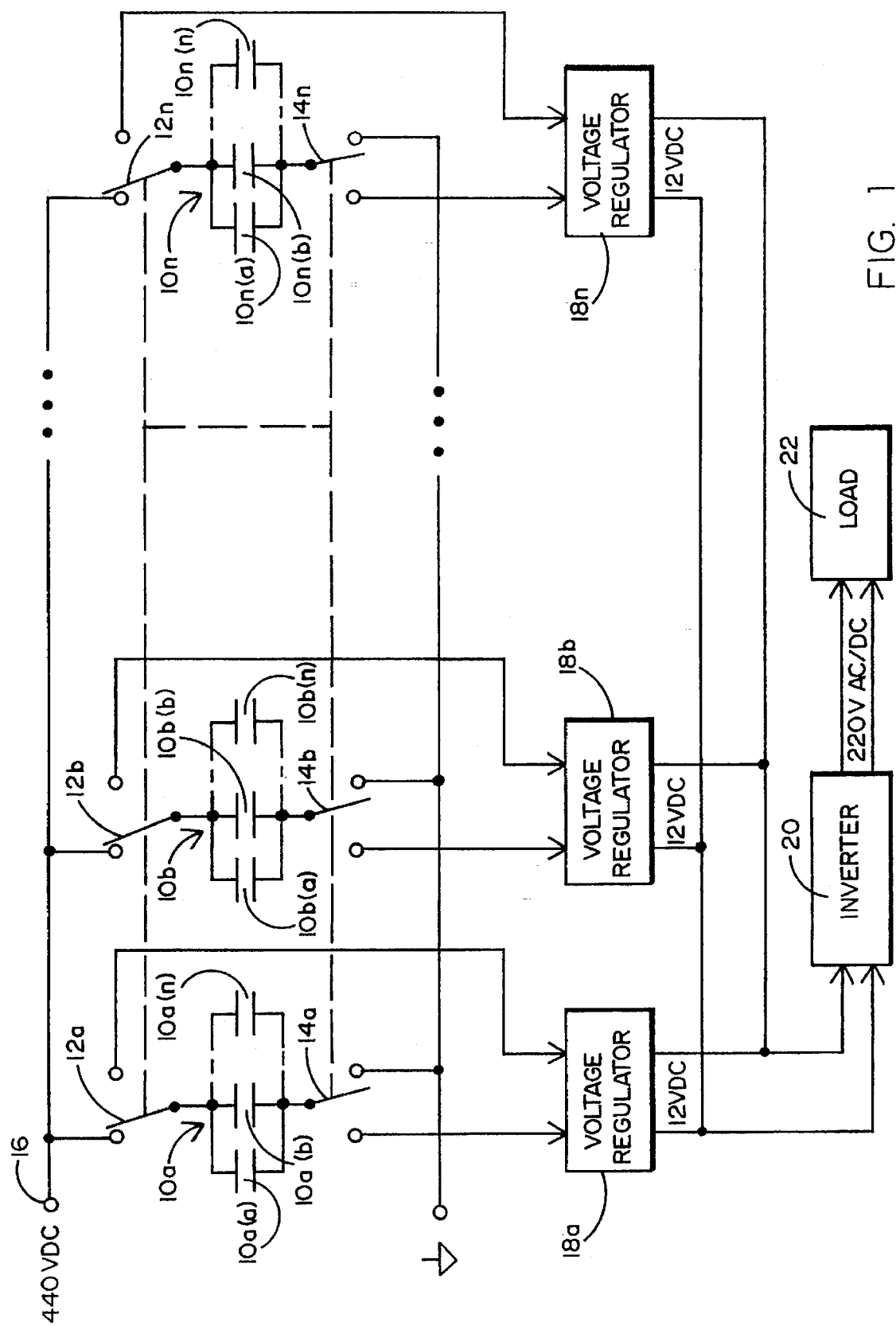
FIG. 1 is a circuit diagram, partially in block form, illustrating one preferred embodiment of the invention.

FIG. 1 shows the energy storage and release system of this invention. The system of FIG. 1 includes a set of capacitor banks 10a through 10n, each containing a plurality of capacitive energy storage means such as capacitors $10a(a)$–$10a(n)$ through $10n(a)$–$10n(n)$. The present invention is useful with very high capacity capacitors which can sustain a high discharge. One example of such high capacity capacitors are activated carbon capacitors such as those recently proposed by Isuzu Corporation of Japan. These capacitors have the ability to put out a substantial amount of power, but their discharge cycle is comparatively short, so that full charge utilization is highly desirable. Another example is the carbon foam aerocapacitor recently developed at Lawrence Livermore National Laboratory.

Other high-capacity capacitor materials for which the present invention is useful include conductive polymers (e.g. conductive polyaniline) recently developed by the University of California at Santa Barbara. Other conductive polymers suitable for this application are those formed by polymerization of thiophene or a derivative such as 3-methylthiophene, as disclosed in the Wrighton et al. U.S. Pat. No. 4,717,673. These conductive polymers have the ability to store a charge without undergoing a chemical reaction, and although they act like capacitors electrically, their storage capacity per unit volume compares favorably with that of an electrochemical battery.

Each of the banks 10a through 10n is individually connectable by switches 12a–12n and 14a–14n to either a high-voltage (e.g. 440 V DC) charging source 16 or to the input of a voltage regulator 18a–18n. The switches 12a–12n and 14a–14n may be of any suitable conventional mechanical or electronic construction. The voltage regulators 18a–18n may be of any suitable conventional type or of the type illustrated in U.S. Pat. No. 3,708,742 to Gunn, as long as their output voltage is a small fraction of the charging source voltage. The arrangement of the capacitors in separately switched banks 10a–10n allows the system of this invention to continue functioning at reduced capacity if one of the capacitors shorts out or otherwise malfunctions. Likewise, the provision of a plurality of voltage regulators 18a–18n individually connected to capacitor banks 10a–10n improves reliability and allows the use of smaller, more readily available voltage regulator units.

The low-voltage (e.g. 12 V DC) outputs of the voltage regulators 18a–18n are connected in parallel to form the input to an inverter 20. The inverter 20 may be any of numerous commercially available inverters commonly used in mobile power applications and designed to convert 12 V DC to 110 or 220 V DC or AC. The output of the inverter 20 can then drive any desired commercial motor or other load 22.

In operation, the ganged switches 12a–12n and 14a–14n are initially thrown to the position shown in FIG. 1 so as to connect capacitors 10a(a)–10n(n) to the 440 V DC source 16 for charging. When it is desired to use the stored energy, switches 12a–12n and 14a–14n are thrown to their other position, and their charge then constitutes the input to voltage regulators 18a–18n.

As long as the load 22 is constant, the voltage regulators 18a–18n draw power from the capacitors 10a(a)–10n(n) at a substantially constant rate as long as the capacitor voltage exceeds the regulators' output voltage. The rate of power draw is typically maintained constant by drawing power from the capacitors in the form of a square wave whose duty cycle is variable to compensate for the capacitors' voltage drop as they discharge. This process is illustrated in the above-cited U.S. Pat. No. 3,708,742.

The output of each individual voltage regulator 18a–18n is 12 V DC. Inasmuch as each individual regulator has a limited current-producing capacity, the outputs of the voltage regulators 18a–18n are connected in parallel to provide a sufficient level of input current to inverter 20 to provide the required power to load 22. The output of inverter 20 may be, for example, a steady 110 AC which, to the load 22, is indistinguishable from regular commercial power.

When the voltage of capacitors 10a(a)–10n(n) drops down to 12 V, power delivery to the load 22 is stopped (conventional switching circuitry in the voltage regulators 18a–18n or the inverter 20 may be used to disconnect the voltage regulators from the inverter), and the capacitors 10a(a)–10n(n) need to be reconnected to the charging source 16 via switches 12a–12n and 14a–14n.

Figure 2:
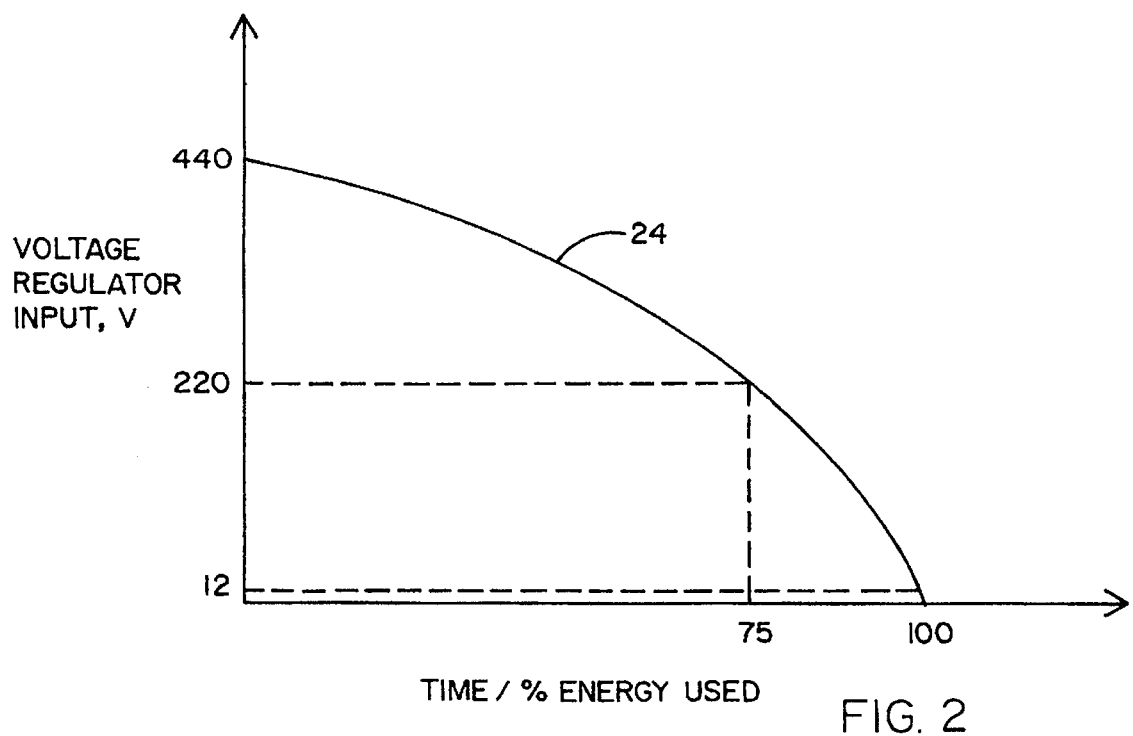
FIG. 2 is a time-amplitude diagram illustrating the operation of the embodiment of FIG. 1.

FIG. 2 illustrates the advantage gained by the use of the invention. Curve 24 shows the output voltage of any individual capacitor bank 10a–10n as a function of time when energy is drawn therefrom at a constant rate. The energy stored in a capacitor is given by the formula $$E = \frac{1}{2} CV^2$$

wherein

E is the stored energy in Wsec or joules

C is the capacitor's capacitance in farads, and

V is the instantaneous capacitor voltage in volts.

Consequently, if, as discussed above, the voltage regulators 18a–18n draw power at a constant rate, the capacitors' voltage drop will follow the curve 24.

It will be seen that if the load 22 were driven directly through a voltage regulator whose output were 220 V, the capacitor banks 10a–10n would have to be recharged after only a little more than three-fourths of the time than they would if a 12 V regulator is used in accordance with the invention; in other words, the invention extends the time between recharges by more than 30%. Of course, the recharging time in the invention is longer because the capacitors are nearly totally discharged rather than half discharged, but that is of little consequence for the applications contemplated by the invention (e.g. the operation of equipment remotely from a suitable charging source and load leveling applications), in which the critical parameter is the time between charge operations.

The invention thus makes it possible to fully utilize the advantages of solid-state circuitry in energy storage systems and to overcome for high-power applications the high weight and limited life inherent in electrochemical batteries. In addition, it allows a capacitor-based system to put out AC power if desired.

Figure 3:
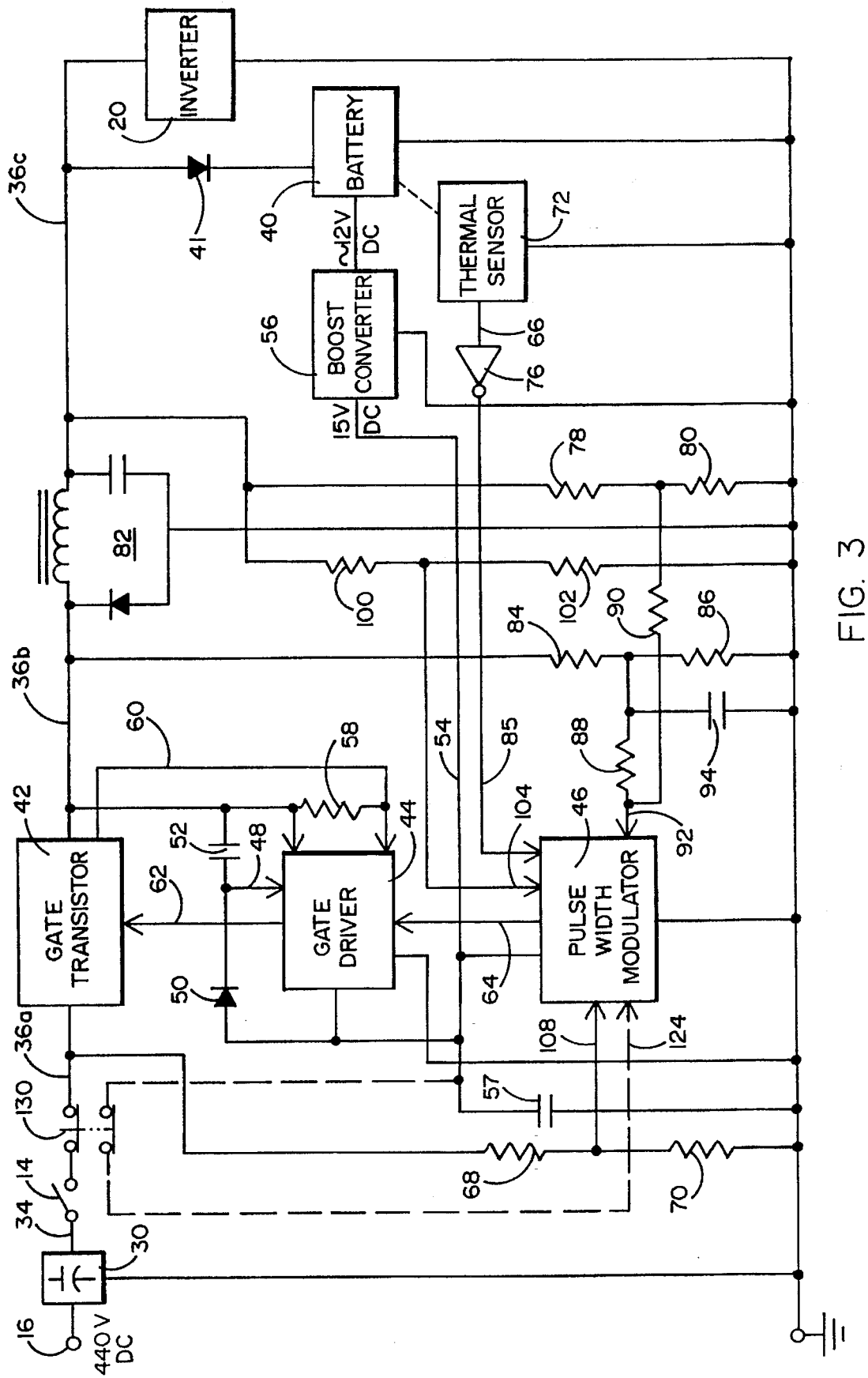
FIG. 3 is a circuit diagram, partly in block form, illustrating another preferred embodiment of the invention.

A specific preferred embodiment of the voltage regulator 18 (which is typical of voltage regulators 18a through 18n) of this invention is illustrated in FIG. 3, in which control signal inputs to the various components of the circuit are indicated by arrows. In that figure, the box 30 schematically represents the bank of high-capacity capacitors 10a(a) through 10n(n) of FIG. 1. The 440 V DC source 16 is selectively connectable to the capacitor bank 30 as shown in FIG. 1 for charging purposes.

The output 34 of capacitor bank 30 is connected by way of buses 36a, 36b and 36c to the inverter 20. The bus 36a may be selectively disconnected from the capacitor bank output 34 by switch 14 which is representative of switches 14a through 14n. The inverter 20 is connected in parallel with a conventional 12 V electrochemical storage battery 40 through a diode 41.

Capacitor bank power to the inverter 20 is controlled by a switching transistor 42 which can be, e.g., a gate MOSFET such as a JS225010 MOSFET marketed by Powerex Corporation. The transistor 42 is turned on and off, preferably at a frequency in the kilohertz range, by the output of a gate driver 44. The pulse width of the square wave thus generated by driver 44 is controlled by a pulse width modulator 46.

Figure 5:
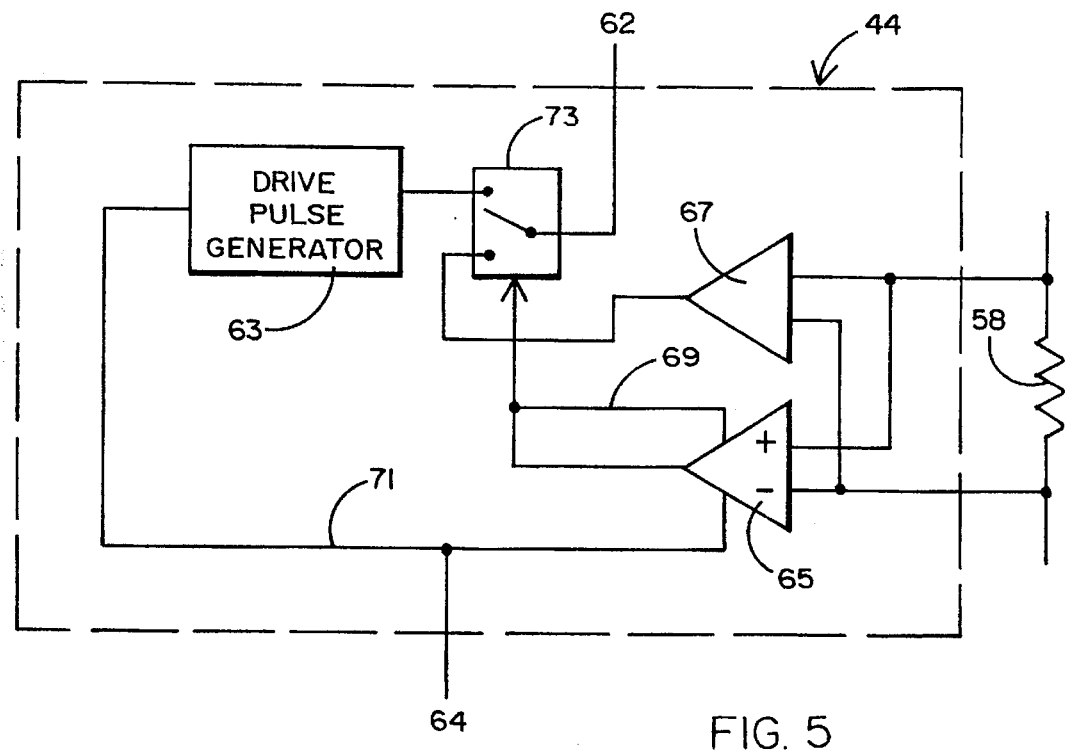
FIG. 5 is a circuit diagram, partly in block form, illustrating the operation of the gate driver used in this invention.
Figure 6A:
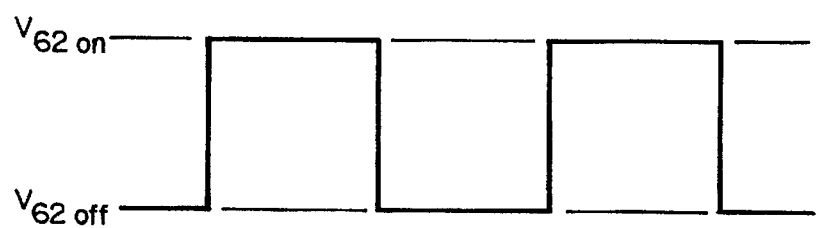
FIG. 6a is a time-amplitude diagram illustrating the output of the gate driver with normal current drain.
Figure 6B:
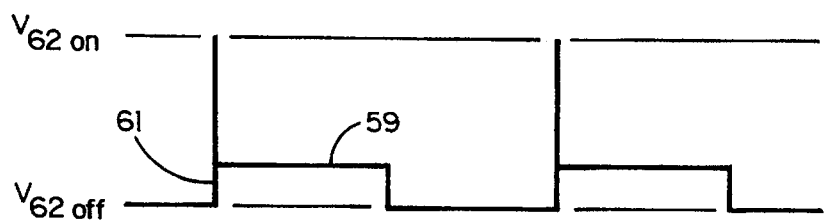
FIG. 6b is a time-amplitude diagram illustrating the output of the gate driver with excessive current drain.

The gate driver 44 may be a conventional integrated circuit device such as an IR2125 chip manufactured by International Rectifier Corporation. The operation of the gate driver 44, illustrated schematically in FIG. 5, is as follows: Normally, output 62 toggles between the full-on $V_{62on}$ and full-off $V_{62off}$ bias voltage of transistor 42 generated by drive pulse generator 63 in synchronism with the high and low states of the square wave input 64 from pulse width modulator 46 (FIG. 6a). If, at the rising edge 61 of output 62 (FIG. 6b), excessive current starts to flow through transistor 42, the resulting overvoltage across resistor 58 causes the comparator 65 to switch the output 62 (in about half a microsecond) to a feedback circuit controlled by amplifier 67. This feedback circuit reduces the bias voltage at output 62 to a level 59 which causes the transistor 42 to operate at the maximum rated current level set by the value of resistor 58. Comparator inputs 69 and 71 are schematically drawn in FIG. 5 to indicate that the comparator 65 latches the switch 73 until the falling edge of input 64 turns the transistor 42 off and resets the switch 73.

Power to the output 62 of driver 44 is supplied from a bootstrapped input 48 connected between a load diode 50 and a bootstrap capacitor 52 so as to float on the high voltage. The load diode provides load current from a control power bus 54 which is maintained at +15 V by a conventional boost converter 56 connected to the battery 40. Capacitor 57 drains off any stray AC component which may exist on bus 54. The battery is maintained in a charged condition by diode 41, which allows charging current to flow to the battery 40 but prevents the battery 40 from driving the inverter 20.

Figure 7:
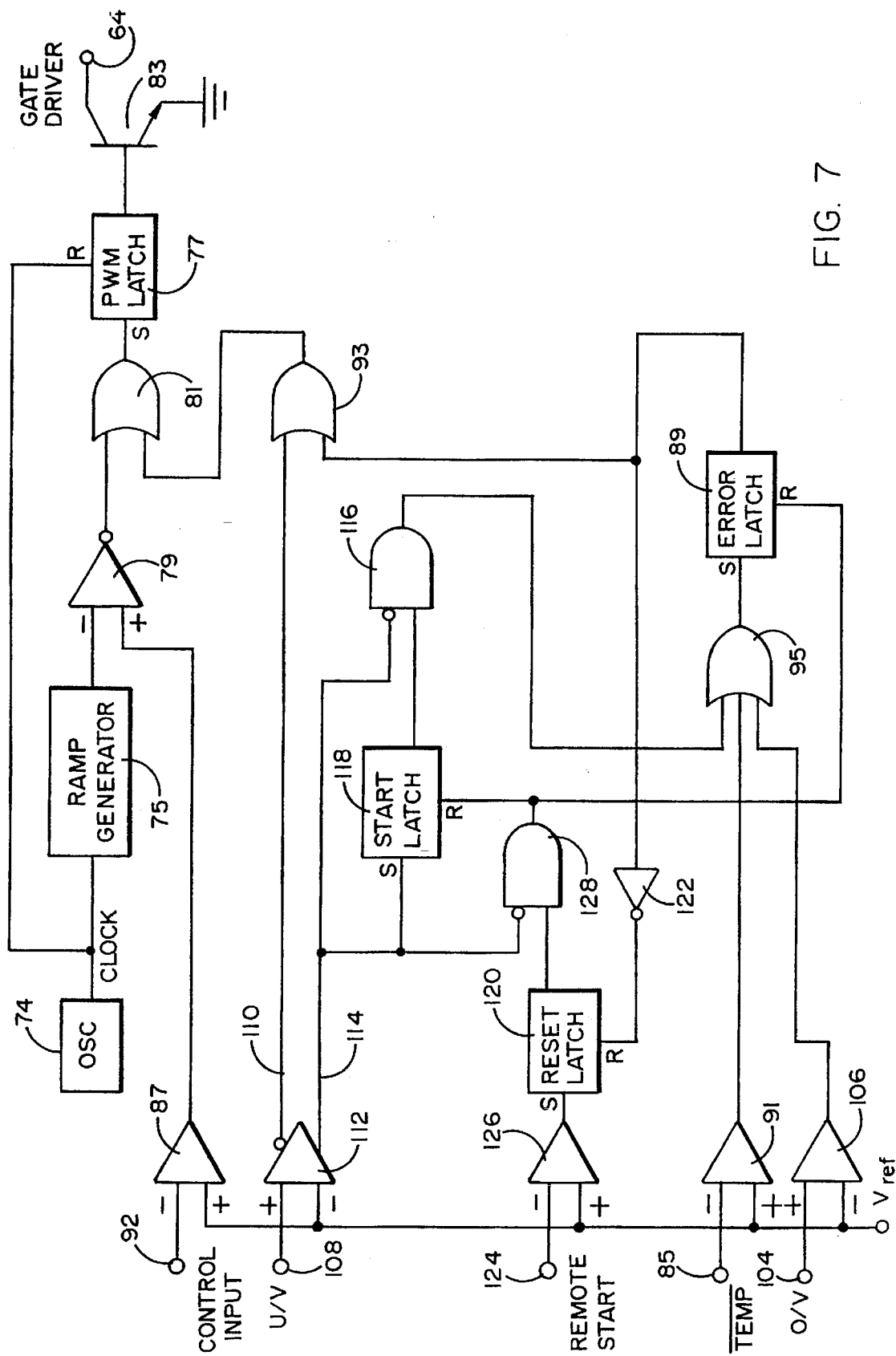
FIG. 7 is a logic diagram illustrating the operation of the pulse width modulator used in this invention.

The pulse width modulator 46, is powered by the regulated 15 V output of boost converter 56 via control power bus 54. The operation of pulse width modulator 46 is illustrated in FIG. 7: An oscillator 74 produces a square wave clock of fixed frequency. The rising edge of the clock resets and triggers a ramp generator 75, and also provides a momentary reset pulse to pulse latch 77. The output of ramp generator 75 is applied to the negative input of comparator 79, while the control input 92, inverted by inverting amplifier 87, is applied to its positive input. When the output of the ramp generator 75 rises past the level of input 92, the inverted output of comparator 79 goes high, and pulse latch 77 sets through OR gate 81. The output of pulse latch 77 enables inverting transistor 83. Transistor 83 grounds the input 64 of gate driver 44; consequently, gate driver 44 is off when pulse latch 77 is set, and on when pulse latch 77 is reset. Thus, the higher the input voltage at 92, the earlier in the clock cycle the set of pulse latch 77 occurs, and therefore the lower the duty cycle of gate driver 44.

The duty cycle of the square wave appearing at output 64 is thus controlled by the voltage on bus 36c, which is the input voltage of inverter 20. This voltage is reduced to an appropriate control level by voltage divider 78, 80. For a reason discussed below, the voltage on bus 36b, i.e. the output of switching transistor 42 prior to filtering by the filter 82, is reduced by voltage divider 84, 86 and then mixed with the output of voltage divider 78, 80 by voltage divider 88, 90. Any high-frequency ripple in the resulting control input 92 is removed by capacitor 94.

The operation of the control circuit is as follows: When a load is applied with the capacitor bank 30 fully charged, switch 39 is closed, and switching transistor 42 begins to operate because its input side is now at higher potential than its output side. The gate of transistor 42 is alternately driven high and low by the output 62 of the gate driver 64, as long as the current drawn from transistor 42 on bus 36b does not exceed the allowable limit determined by the value of current sense resistor 58.

To prevent overheating of the battery 40, it may be equipped with a thermal sensor 72 whose output 66 is inverted by an inverter schematically represented at 76 and applied to input 85 of the pulse width 66 modulator 46. When the temperature of the battery 40 exceeds a predetermined amount, the pulse width modulator 46 is disabled by the error latch 89 which sets through OR gate 95 when the input 85 drops below a fixed reference voltage $V_{ref}$ applied to comparator 91. As long as error latch 89 remains set, the pulse latch 77 remains set through OR gates 81 and 93, and the gate driver input 64 remains grounded except during the momentary reset pulse applied to pulse latch 77 during the rising edge of the clock. Thus, if the battery temperature exceeds a predetermined safe limit, the transistor 42 remains shut off until the problem has been corrected and the error latch 89 reset.

The error latch can also be set by an overvoltage DC condition on the load or battery bus 36c. When the voltage produced by voltage divider 100, 102 at input 104 of the pulse width modulator 46 exceeds the reference voltage $V_{ref}$ (FIG. 7), the comparator 106 sets the error latch 89 through a second input of OR gate 95. Finally, a third condition which sets the error latch 89 is the exhaustion or shut-off of the capacitor bank 30. If switch 39 is opened or the output voltage of capacitor bank 30 on line 34 drops below about 120 V, the voltage produced at undervoltage input 108 of pulse width modulator 46 by voltage divider 68, 70 drops below the level of $V_{ref}$, and the inverted output 110 of comparator 112 sets the PWM latch 77 through OR gates 93 and 81. At the same time, as the output 114 of comparator 112 goes low, the inverted input to AND gate 116 cooperates with the high output of still set start latch 118 to set the error latch 89 through the third input of OR gate 95.

The setting of error latch 89 removes the dominant reset condition of reset latch 120 through inverter 122 and thereby enables the resetting of error latch 89. If the output of comparator 126 is high (as it may be under certain cirumstances discussed below), the reset latch will immediately set. The low condition of comparator output 114 at this time cooperates with the set of reset latch 120 in AND gate 128 to reset error latch 89 and start latch 118. The reset of start latch 118 prevents AND gate 116 from setting error latch 89 again through OR gate 95. If, on the other hand, the output of comparator 126 is low (as it may be under other circumstances discussed below), error latch 89 remains set, and reset latch 120 reset, until the output of comparator 126 goes high.

Following an undervoltage condition on bus 36a, the power supply through gate transistor 42 can be restarted either automatically when the voltage on bus 36a once again exceeds 120 V, or manually after sufficient voltage has been restored on bus 36a. The selection is made by controlling the output of comparator 126 through the provision or omission of a Remote Start signal applied to input 124 of pulse width modulator 46.

For automatic restart, the Remote Start input 124 is left unconnected. Consequently, the output of comparator 126 is always high, and reset latch 120 immediately sets when the undervoltage condition sets error latch 89. The resulting immediate reset of error latch 89 and reset latch 120, as explained above, allows the continuous set of PWM latch 77 to be removed when the restoration of sufficient voltage on bus 36a causes the inverted output 110 of comparator 112 to go low. For manual restart, a continuous signal exceeding $V_{ref}$ is applied to input 124 (dotted line in FIG. 3). This maintains the output of comparator 126 low, and prevents the reset latch 120 from setting, until the signal applied to input 124 is momentarily interrupted while the undervoltage condition exists, as by a Remote Start push button 130 (FIG. 3).

If the error latch 89 was set by an overheating or overvoltage condition, an undervoltage condition on bus 36a, with the output of comparator 126 high, must be created (e.g. by pushing button 130), after correcting the problem, to reset error latch 89.

Figure 4A:
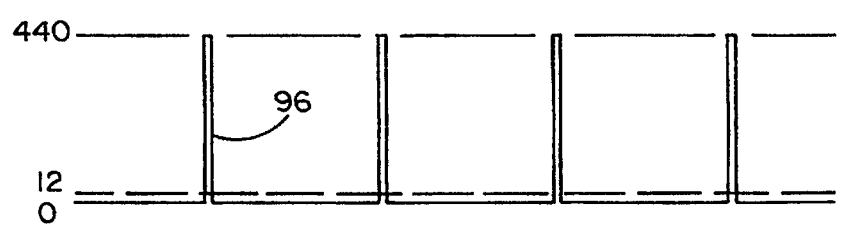
FIG. 4a is a time-amplitude diagram illustrating the duty cycle of the energy supply from the capacitor bank of FIG. 3 when the capacitor bank is at maximum charge.
Figure 4B:
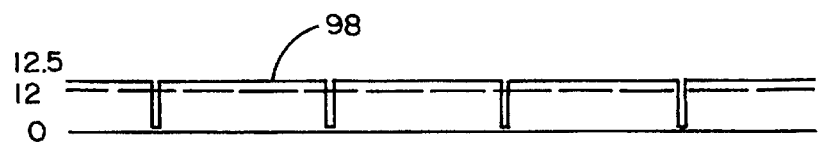
FIG. 4b is a time-amplitude diagram showing the duty cycle at minimum charge.

The duty cycle of the gate driver output 62 controls the voltage on bus 36b. When the capacitor bank 30 is charged to a full 440 V, a duty cycle of 2.7% (96 in FIG. 4a) will effectively produce 12V on buses 36b and 36c. To achieve the same when the capacitor bank has discharged to about 12.5 V, a 96% duty cycle (98 in FIG. 4b) is required. As the capacitor output drops below 12.5 V, the voltage differential between the input and the output of the transistor 42 becomes too low to allow the transistor 42 to function. At that point, pulse width modulator 46 shuts off the gate driver 44.

By appropriately selecting the resistors 78, 80, 84, 86, 88 and 90 to produce at input 92 the signal or voltage levels specified by the manufacturer of the modulator chip 46, the voltage on bus 36c can be maintained at a steady 12 V DC as long as the capacitor bank 30 is sufficiently charged.

It will be seen that the above-described circuit provides a combination of voltage and current regulation which makes it possible to safely drive an inverter from a high-capacity capacitor bank.

We claim:

1. A capacitor-based energy storage and release system comprising:
   a) capacitive energy storage apparatus having a capacitor voltage thereacross when charged;
   b) a voltage regulator arranged to produce an output at an output voltage which is a small fraction of said capacitor voltage as long as said capacitor voltage is higher than said output voltage;
   c) a switch for selectably connecting said energy storage means to a source of relatively high charging voltage, and to the input of said voltage regulator means; and
   d) an inverter connected to said voltage regulator and arranged to convert said output voltage to a substantially higher load operating voltage;
   e) said voltage regulator including:
      i) a transistor, said capacitive energy storage apparatus being connected to said inverter through the emitter-collector circuit of said transistor, and said transistor being arranged to be turned on and off in accordance with a variable duty cycle to produce a square-wave output voltage peaking at said capacitor voltage;
      ii) control circuitry connected to said transistor and arranged to vary said duty cycle so as to produce a current-limited transistor output at a substantially constant average voltage, regardless of variations in said capacitor voltage and the current requirements of said load, said control circuitry including
         1) a pulse width modulator operatively connected to said inverter and arranged to put out a pulse train whose duty cycle is variable in such a way as to maintain a substantially constant average voltage on said inverter during variations in the voltage of said energy storage apparatus;
         2) a gate driver connected to said transistor and said pulse width modulator and arranged to switch said transistor on and off in synchronism with said pulse train; and
         3) a current sensor connected to said transistor and to said control circuitry and arranged to substantially limit the current drawn through said transistor to a predetermined value;
      iii) a battery for providing power to said pulse width modulator and gate driver; and
      iv) a diode arranged to allow said battery to be charged from the input to said inverter but to prevent it from driving said inverter;
      v) said pulse width modulator having applied thereto a signal which is a function of the voltage at said inverter and the average voltage at the output of said transistor, said duty cycle of said pulse train being so varied by a combination of said voltages as to maintain said combination of voltages substantially constant in spite of substantial variations in the voltage of said energy storage apparatus.

2. A capacitor-based energy storage and release system comprising:
   a) capacitive energy storage apparatus having a capacitor voltage thereacross when charged;
   b) a voltage regulator arranged to produce an output at an output voltage which is a small fraction of said capacitor voltage as long as said capacitor voltage is higher than said output voltage;
   c) a switch for selectably connecting said energy storage means to a source of relatively high charging voltage, and to the input of said voltage regulator means; and
   d) an inverter connected to said voltage regulator and arranged to convert said output voltage to a substantially higher load operating voltage;
   e) said voltage regulator including:
      i) a transistor, said capacitive energy storage apparatus being connected to said inverter through the emitter-collector circuit of said transistor, and said transistor being arranged to be turned on and off in accordance with a variable duty cycle to produce a square-wave output voltage peaking at said capacitor voltage;
      ii) control circuitry connected to said transistor and arranged to vary said duty cycle so as to produce a current-limited transistor output at a substantially constant average voltage, regardless of variations in said capacitor voltage and the current requirements of said load, said control circuitry including
         1) a pulse width modulator operatively connected to said inverter and arranged to put out a pulse train whose duty cycle is variable in such a way as to maintain a substantially constant average voltage on said inverter during variations in the voltage of said energy storage apparatus;
         2) a gate driver connected to said transistor and said pulse width modulator and arranged to switch said transistor on and off in synchronism with said pulse train; and
         3) a current sensor connected to said transistor and to said control circuitry and arranged to substantially limit the current drawn through said transistor to a predetermined value;
      iii) a battery for providing power to said pulse width modulator and gate driver; and
      iv) a diode arranged to allow said battery to be charged from the input to said inverter but to prevent it from driving said inverter.

3. The apparatus of claim 2, in which said voltage regulator further includes:
   v) a temperature sensor for producing a signal representative of the temperature of said battery, said signal being connected to said control circuitry so as to maintain said transistor in a disconnect mode when the temperature of said battery exceeds a predetermined limit.

* * * * *